(12) United States Patent
Karr

(10) Patent No.: US 7,693,755 B2
(45) Date of Patent: Apr. 6, 2010

(54) AUCTION PROGRAM WITH AUCTIONEER CHARACTER FIGURE, CLOSEOUT COUNTDOWN AND BID PADDLE DISPLAYS

(76) Inventor: Donald E. Karr, 754 Lakeside Dr., North Palm Beach, FL (US) 33408

( * ) Notice: Subject to any disclaimer, the term of this patent is extended or adjusted under 35 U.S.C. 154(b) by 752 days.

(21) Appl. No.: 11/532,914

(22) Filed: Sep. 19, 2006

(65) Prior Publication Data

US 2008/0071632 A1 Mar. 20, 2008

(51) Int. Cl.
*G06F 17/30* (2006.01)
(52) U.S. Cl. .............. 705/27; 705/26; 705/37
(58) Field of Classification Search .......... 705/27, 705/26, 37
See application file for complete search history.

(56) References Cited

U.S. PATENT DOCUMENTS

| 7,440,912 | B2* | 10/2008 | Asher et al. .......... 705/26 |
| 2002/0116320 | A1* | 8/2002 | Nassiri .......... 705/37 |
| 2003/0078793 | A1* | 4/2003 | Toth .......... 705/1 |
| 2004/0193529 | A1* | 9/2004 | Asher et al. .......... 705/37 |
| 2007/0207850 | A1* | 9/2007 | Darrah et al. .......... 463/20 |

OTHER PUBLICATIONS

Wahl, Andrew; "Paul Godin thinks . . . ," Canadian Business, Oct. 9, 1998; Dialog file 20 #03061540, 4pgs.*
Billen, Andrew; "Auction Stations . . . ," Evening Standard, Nov. 1, 2000; Dialog file 20 #13586704, 3pgs.*

* cited by examiner

*Primary Examiner*—Robert M. Pond

(57) ABSTRACT

The computerized auction couples with bidder computers and an auction clearinghouse computer displaying data for the auction goods. The clearinghouse computer accepts bids, sorts bids by value, creates a bid paddle display showing the then highest bid and a bidder identifier. Bidders can incrementally increase bids substantially in real time and clearinghouse displays these further bids. The clearinghouse also accepts high value override bids. The system processes all bids until a maximum bid is accepted and displayed for a predetermined period of time. An auctioneer character figure executes a closing sale routine, first, second and third and final call, for additional bids. In the absence of a higher bid, the auctioneer closes the auction with a sold item routine. The sold item display routine visually and audibly identifies that the auction item is sold. If an additional bid is received during close sale, the system restarts the routine.

11 Claims, 10 Drawing Sheets

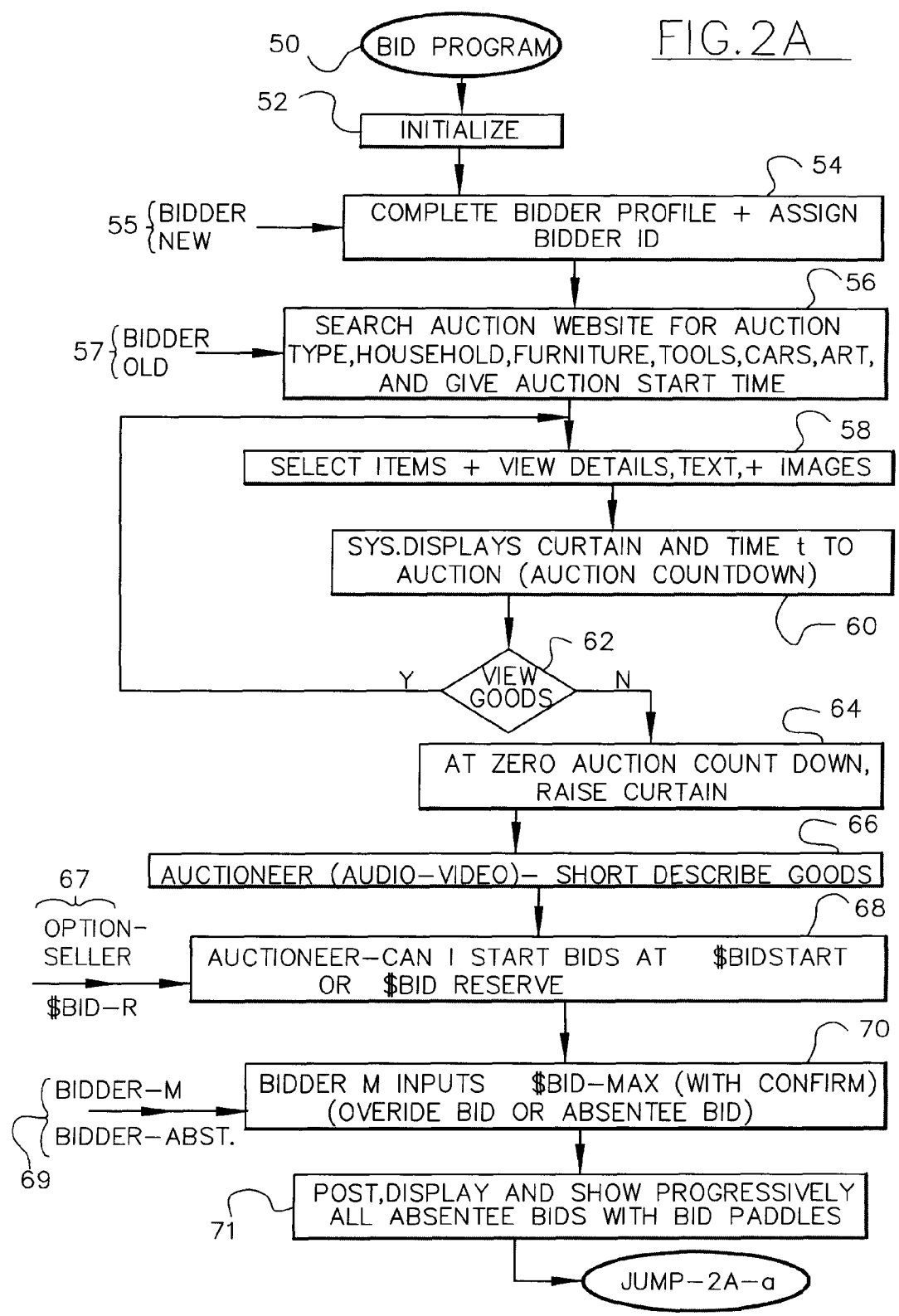

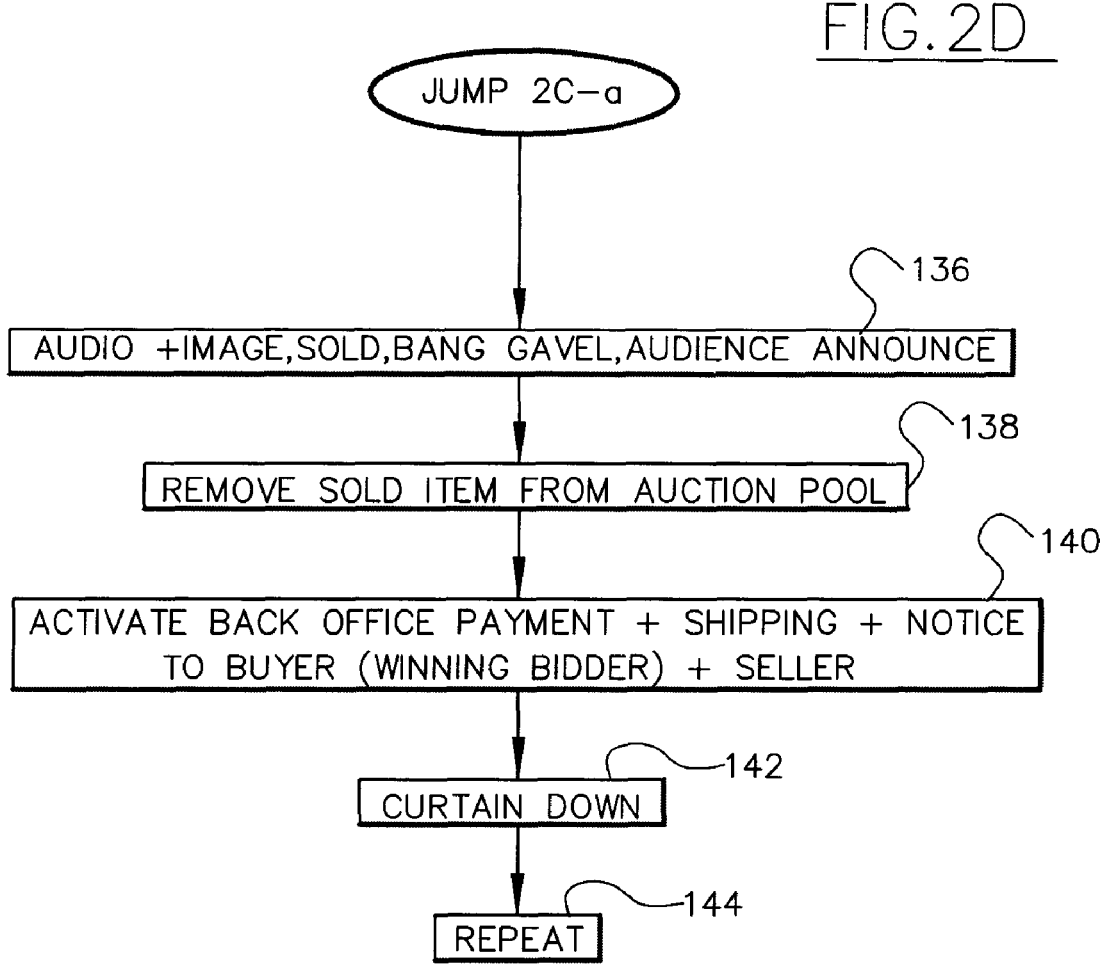

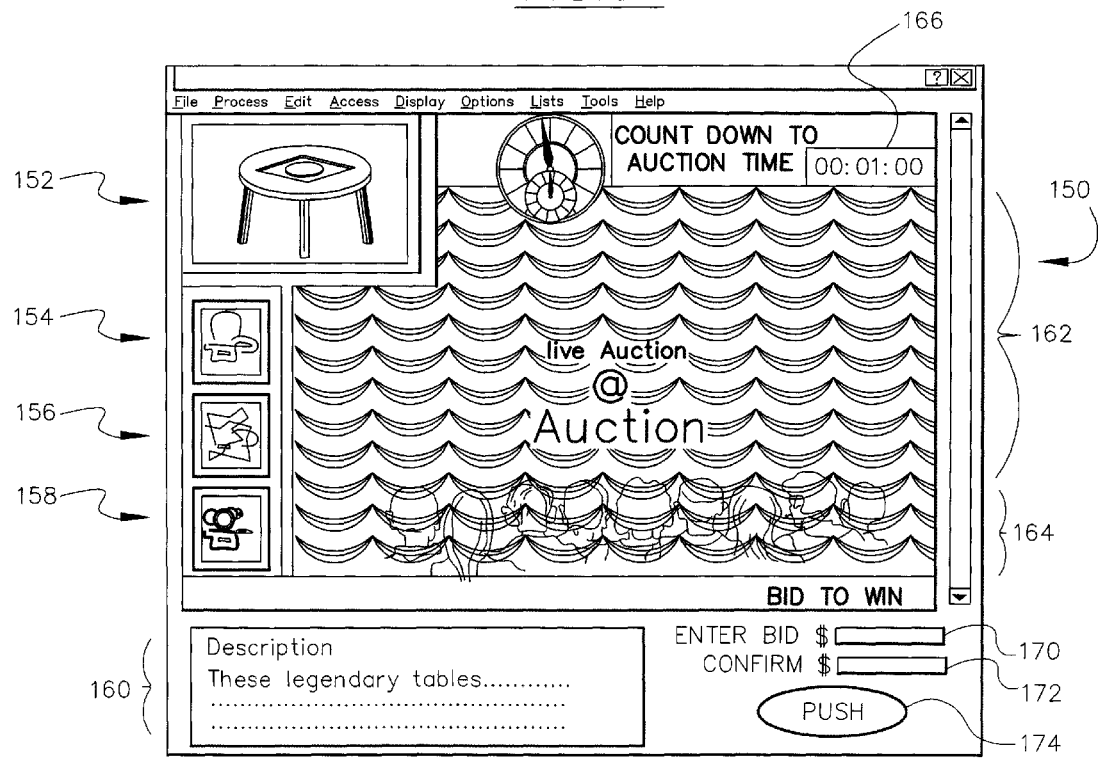

AUCTION PROGRAM WITH AUCTIONEER CHARACTER FIGURE, CLOSEOUT COUNTDOWN AND BID PADDLE DISPLAYS

The present invention relates to a computerized method for conducting an auction of goods or services with an auctioneer figure, a closeout countdown and a bid paddle displays. An active screen area operates as a "bid button" which (a) shows the next incrementally higher bid and, (b) when activated by the user-bidder, places the next higher bid in the auction. A "bid to win" data input enables the user-bidder to input a higher value bid.

BACKGROUND OF THE INVENTION

Computerized auction systems such as the system administered by e-Bay, classically accept electronic bid data from a plurality of bidders. The bidders on networked computers coupled to the e-Bay auction clearinghouse computer, see the goods subject to the auction and bid thereon. At a certain time at the close of the auction, the highest bidder is awarded the goods or services subject to the auction. Thereafter, back office processing systems enable the seller to be paid by the buyer (successful bidder) and facilitate the transfer of the goods or services from the seller to the winning bidder or buyer.

However, the excitement of a live auction is oftentimes not present in the prior art computerized auction systems.

OBJECTS OF THE INVENTION

It is an object of the present invention to provide an auction program with an auctioneer figure which stimulates a plurality of bidders to bid, essentially in real time, for goods or services subject to the auction.

It is a further object of the present invention to provide a computerized method wherein the auctioneer character figure is a visual display (and optionally, an audio presentment) of the closing sale routine.

It is an additional object of the present invention to use an articulated auctioneer character figure.

It is a further object of the present invention to provide a closing sale routine wherein the auctioneer figure has first call, second call and final call routine (video and audio) in order to spur additional bids for the auction goods or services. Audio elements are optional.

It is an additional object of the present invention to provide for absentee bids, reserve bids and maximum over ride or winning bids from one or more of a plurality of bidders (the reserve bid provided by the seller of the auction goods or services and absentee bids placed by user-bidders prior to the live or real time auction).

SUMMARY OF THE INVENTION

In one embodiment, the computerized method conducts an auction for goods and services with a plurality of computers coupled together on a communications network (such as the Internet). At least two of the computers supply first and second groups of bids for goods or services subject to the auction. These bids are received by an auction clearinghouse computer. The auction clearinghouse computer provides display data and information for the auction goods or services to bidder computers and potential bidder computers during the auction. The auction clearinghouse computer accepts the bids and sorts the bids based upon bid value. A display (a bid paddle display) is created showing the then highest bid value and a bidder identifier associated with the highest bid. Bidders on these computers can incrementally increase bids on a substantially real time basis by activating the "Bid Now" button (which displays the next incrementally higher proposed bid) and the auction clearinghouse computer displays and usually audibly announces and visually presents this further bid data. The auction clearinghouse also accepts a high value override bid which represents a "bid to win" the auction item. The high value override bid oftentimes is greater than the incrementally increased bid. The system progresses to process all the bids until a maximum bid is accepted and displayed for a predetermined length of time. A character figure of an auctioneer announces a closing sale subroutine thereafter including at least a first call and a final call (typically also including a second call routine) calling for additional bids greater than the then maximum bid. In the absence of a greater, additional bid, the auctioneer character figure closes the auction with a sold item display routine. The sold item display routine visually and audibly identifies that the auction item is sold. In the event the auction clearinghouse computer receives a greater, additional bid from another computer operated by a bidder during the closing sale subroutine, the system restarts the closing routine. A processing system for auctioned goods or services is also discussed.

BRIEF DESCRIPTION OF THE DRAWINGS

Further objects and advantages of the present invention can be found in the detailed description of the preferred embodiment when taken in conjunction with the accompanying drawings in which:

FIGS. 2A-2D diagrammatically illustrate the major flow chart or functional elements for the auction program (please note that these elements may be reorganized or consolidated to increase processing speed).

FIG. 3 diagrammatically illustrates the pre-auction display and viewing of the article subject to the auction.

DETAILED DESCRIPTION OF THE PREFERRED EMBODIMENT

Figure 1:
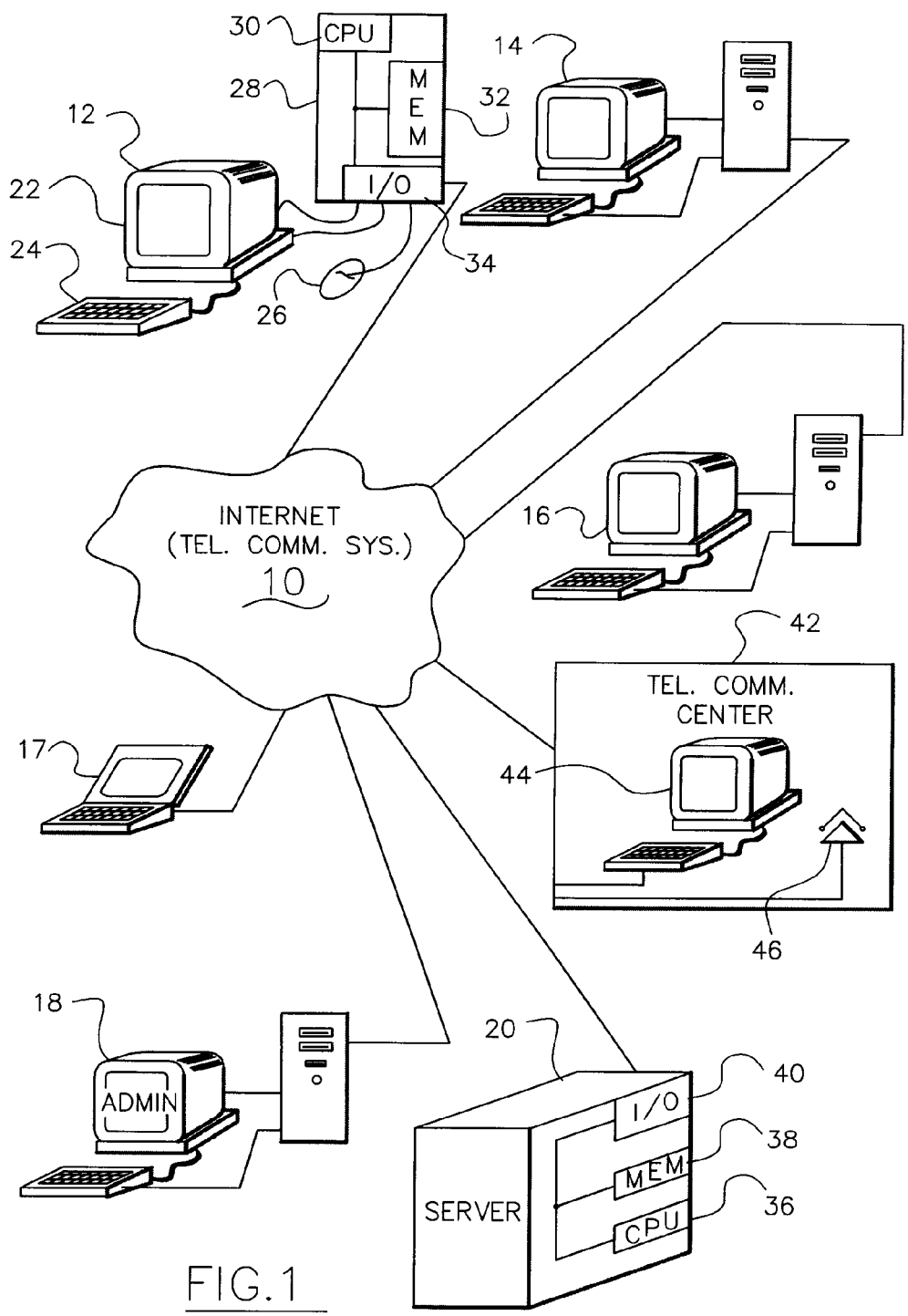
FIG. 1 diagrammatically illustrates atypical computer system over which is deployed the auction program.

The present invention relates to a computerized auction system program deployed over a plurality of computers coupled to a telecommunications network. The system works on a personal computer (PC), on a computer network (LAN or WAN) and over the Internet and includes computer programs, computer modules and information processing systems to accomplish this auction system. The system simulates a live auction with real time computer processing and communication routines. In addition to the computer implementation of the inventive aspects of this invention, a computer implemented business method is also encompassed herein.

It is important to know that the embodiments illustrated herein and described herein below are only examples of the many advantageous uses of the innovative teachings set forth herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality. In the drawings, like numerals refer to like parts or features throughout the several views.

The present invention could be produced in hardware or software, or in a combination of hardware and software, and these implementations would be known to one of ordinary skill in the art. The system, or method, according to the inventive principles as disclosed in connection with the preferred embodiment, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in the art.

According to the inventive principles as disclosed in connection with the preferred embodiments, the invention and the inventive principles are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer as would be known to one of ordinary skill in the art. The computer medium which may be used to hold or contain the computer program product, may be a fixture of the computer such as an embedded memory or may be on a transportable medium such as a disk, as would be known to one of ordinary skill in the art. Further, the program, or components or modules thereof, may be downloaded from the Internet of otherwise through a computer network.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, flash memory, floppy disk, disk drive memory, CD-ROM, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network, that allow a computer to read such computer readable information.

In the drawings, and sometimes in the specification, reference is made to certain abbreviations. The following Abbreviations Table provides a correspondence between the abbreviations and the item or feature.

ABBREVIATIONS TABLE

Admin administration
Alm alarm, audio or visual or combo, such as trig aim
ASP application service provider—server on a network
comm. communications, typically telecommunications
comp computer
cnt count such as time count down
CPU central processing unit
DB data base
disp display
doc document
I/O input/output
id identifier, such as Bidder Id.
invt inventory
mem memory
ntwk network as in "comm ntwk"—communications network
pgm program
PO printed out document
req request
rpt report
sch search
sys system
t time
tele-com telecommunications system or network
URL Uniform Resource Locator, x pointer, or other network locator
$Bid-R Reserve Bid supplied by seller (optional)
$Bid-Res same as $Bid-R
$BidA-inc.1 incrementally higher bid by Bidder A
$Bid-max maximum bid from Bidder-M
Bidder M Bidder who inputs set price as a maximum or hopefully a winning bid $Bid-Max
Bidder-Abst Absentee Bidder who inputs bid before auction starts
Bidder A,B,C One of many bidders, Bidder-A, Bidder-B, Bidder-C, Bidder-M FIG. 1 diagrammatically illustrates the global telecommunications system or LAN or WAN or Internet 10 which enables communication and data transport between a plurality of relatively independent computer systems 12, 14, 16, 17, 18 and 20. Computer system 12 includes monitor 22, input device or keypad 24, input device or mouse 26, and processor unit 28. Processor unit 28 includes a central processing unit or CPU 30, memory 32 and an input/output or I/O device 34. It should be appreciated that memory 32 represents many types of data storage including hard drives, volatile and non-volatile memory, and removable drives. Also, I/O 34 represents a plurality of input/output devices which are utilized to couple items which are peripheral to processing unit 28. I/O 34 is connected to Internet 10. Computer 17 is a laptop computer which can easily be disconnected from Internet 10. Laptop 17 also represents PDAs and configured cell phones coupled to communications system 10. Computer 18 is an administrative computer which assists in the overall control and operation of the auction system and the method described herein. Computers 12, 14, 16 and 17 are client computer systems operated by bidders. Computer 18 and server 20 represent the auction clearinghouse computer system.

In a preferred embodiment, the system and method are deployed on Internet 10 via computer system server 20. Server 20 includes CPU 36, memory 38 and I/O 40, and is coupled to Internet 10. Server 20 and admin 18 are the auction clearinghouse.

In an expanded embodiment of the present invention, the auction system back office system may be partially or entirely carried out with the use of a telephone communications center 42. The back office system facilitates the payment for auctioned goods and delivery of goods. In the current embodiment of the system, the system operator only collects a listing fee. The telephone communications center typically includes one or a plurality of computers 44 and one or more telephones 46. Human operators may answer telephone inquiries from representatives seeking information regarding an auction. The input of information can be facilitated by a person at telephone communication center 42. For example, computer 44 could display questions which the operator could audibly present via telephone 46 to a caller. The operator would input into computer 44 the caller's answers and system 44 could generate appropriate responses to complete data entry forms for the system. The telephone callers may be the bidders or potential bidders and the telephone operators may electronically input bids therefor.

In a preferred embodiment, inquiries regarding auctions are obtained by utilizing a web browser or other type of interface on a user's computer 12 (a client computer) as those screen displays are deployed by server 20. The information obtained by computer 12 is generally stored in server 20. Thereafter, the information is processed by server 20 and the output information representing processed data is delivered to the user via Internet 10, and ultimately to user or client computer 12.

Although the system and method is described generally for use in conjunction with Internet 10, parts of the system and method could be utilized exclusively by a single computer, such as laptop computer 17, operated by a bidder. Server 20 could be utilized with a CD-ROM storing a major portion of the data bases necessary to carry out the principles of the present invention. Since the bidding process involves a complementary party, that portion must be interactive over a communications channel. Further, the information processing system could be deployed over a local area network or a wide area network or utilized exclusively in-house by a single company with subsidiaries bidding for an auction good or service.

Figure 2B:
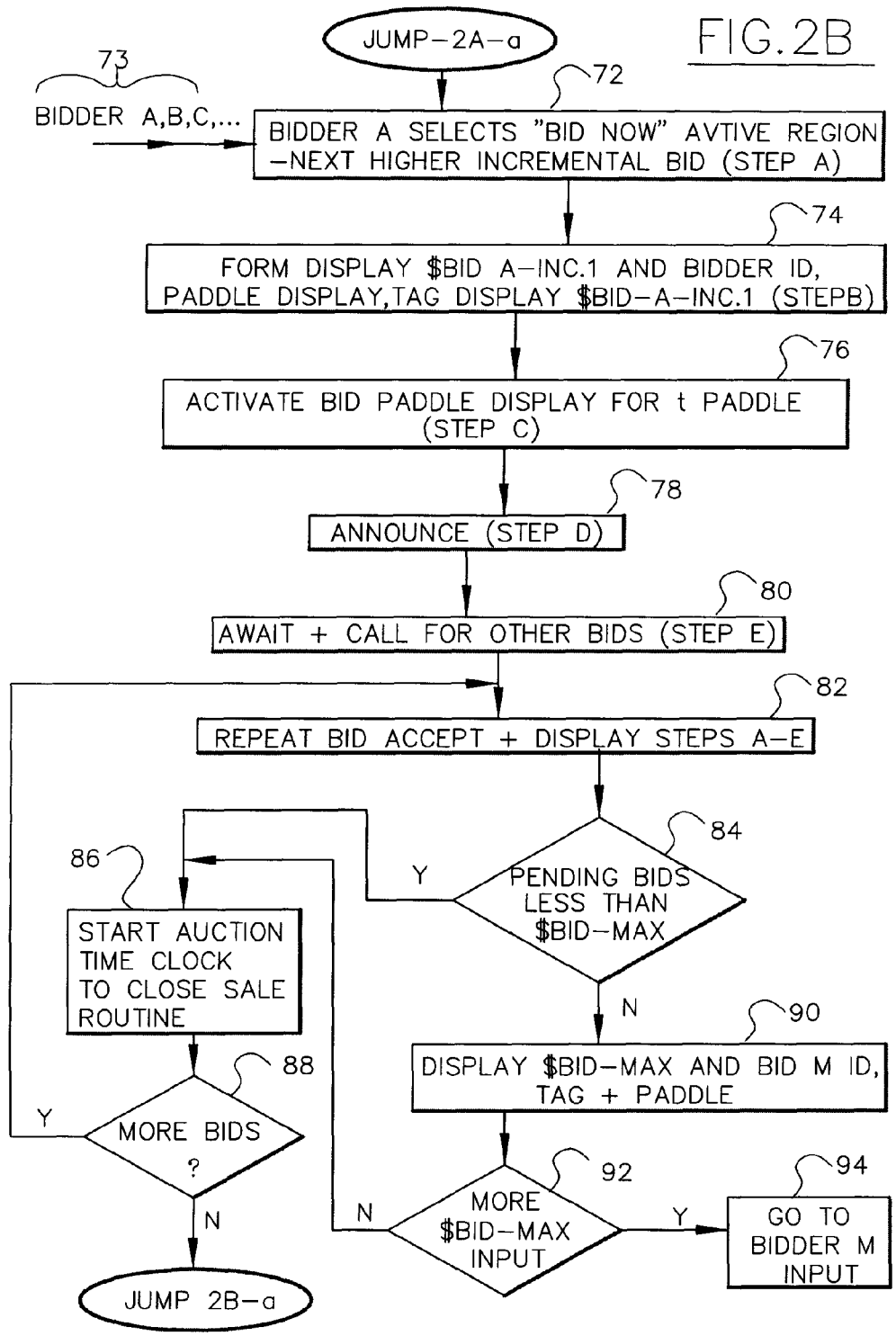
Figure 4A:
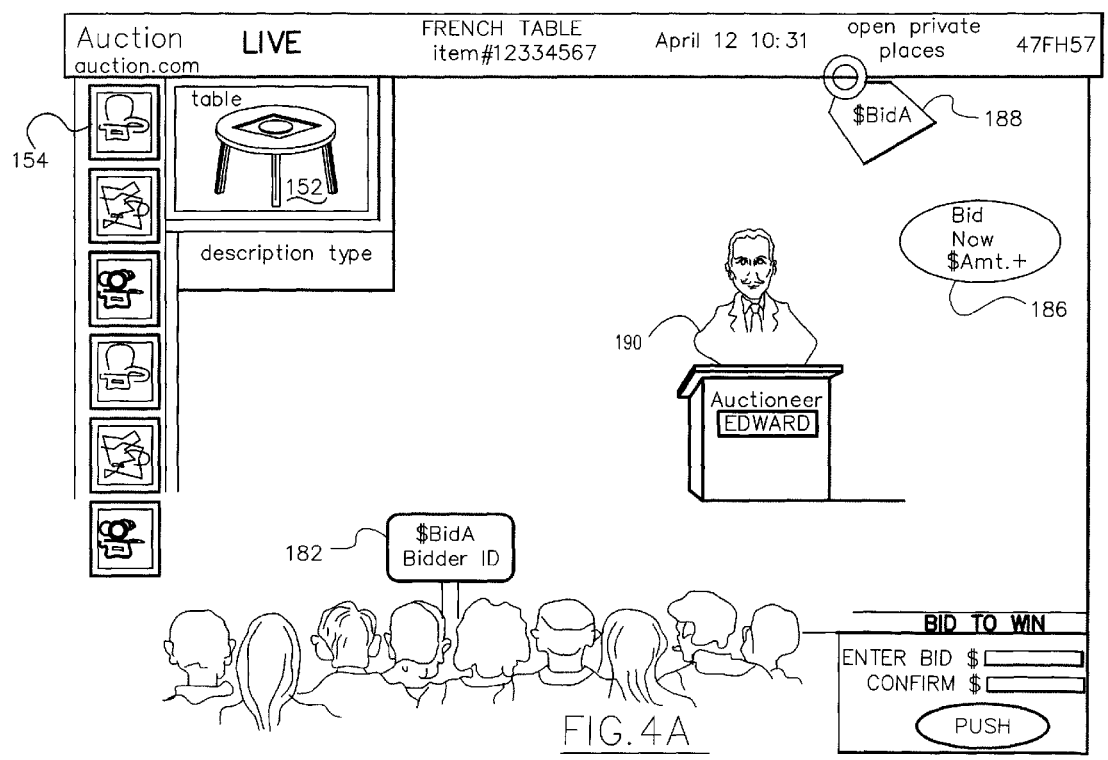
FIGS. 4A-4D diagrammatically illustrate display screens showing the bid process and showing the closing sale routine and sold item routine, in accordance with the principles of the present invention.
Figure 4B:
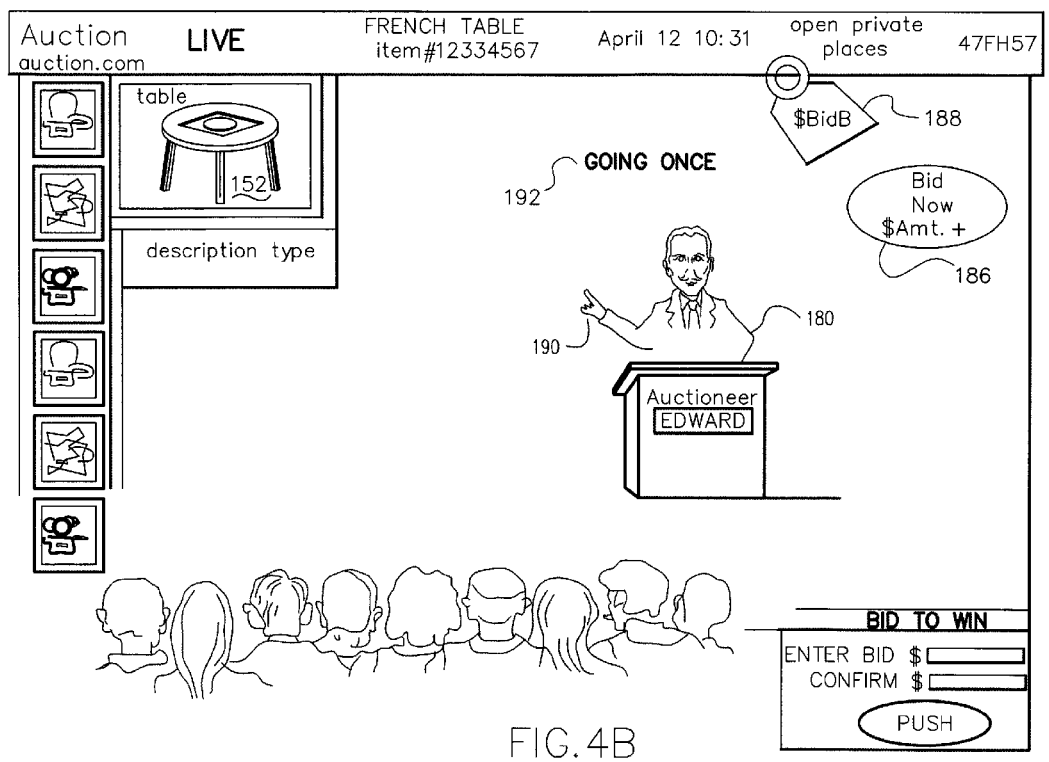
Figure 4C:
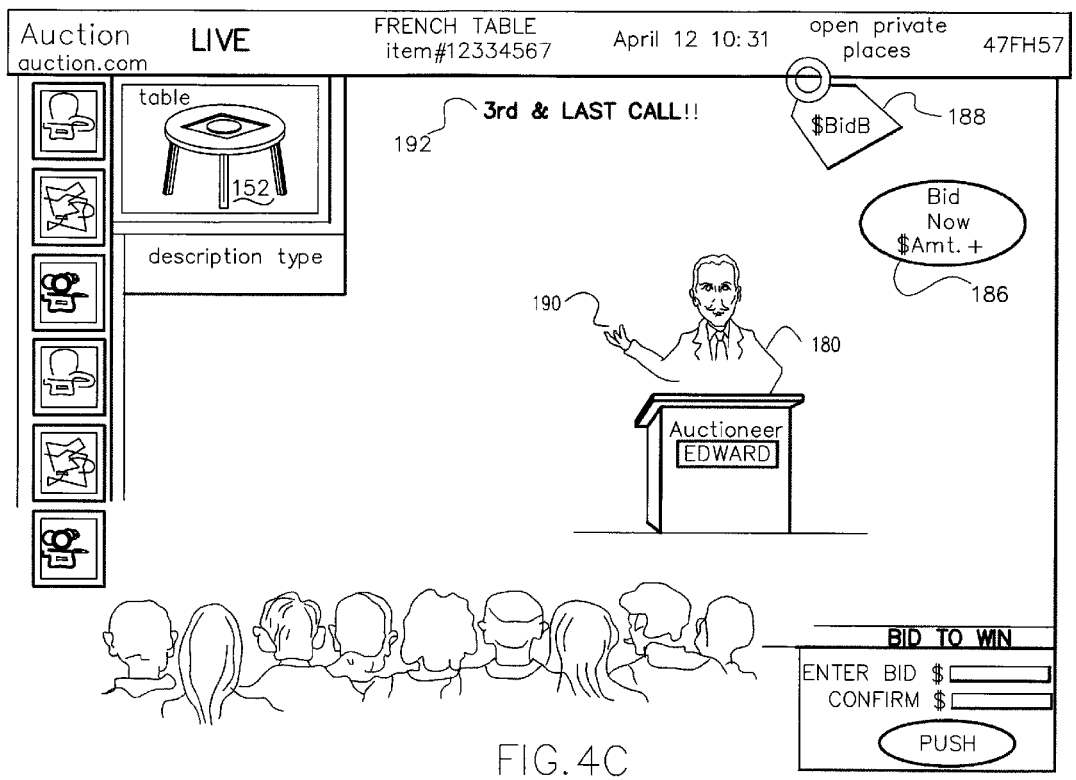

Similar numerals designate similar items throughout the figures. FIGS. 2A-2B diagrammatically illustrate the major components or functional elements of the auction program. These elements can be reorganized, expanded or reduced to increase processing speed for the auction. The display examples in FIGS. 3 and 4A-4B are examples of the types of displays that would be employed in conjunction with the auction. These displays in FIGS. 3 and 4A-4B are discussed concurrently with the flowchart in FIGS. 2A-2B. The flowchart in FIG. 2A illustrates bid program 50. Step 52 initializes the program on the auction clearinghouse computer system which includes administration computer 18 and server 20 (FIG. 1). Step 54 accepts the input from a new bidder 55 to complete a bidder profile and assign a bidder identification number unique to that bidder. The bidder profile consists of, among other things, name, address, credit card, phone number, cell phone and other profile information. It may or may not include a credit rating and credit investigation. The use of a password is also contemplated in conjunction with bid program 50 but the password security and other protection control (SSL subroutines) are not identified nor listed in the figures. In step 56, a search option is provided to one or more of the users on computers 12, 14, 16, 17 of FIG. 1. Although several bidders on several computers 12, 14, 16, 17 are discussed herein, a least two bidders on two computers are necessary for the auction operation. A search function enables the users who are potential bidders on those computers to search the auction website provided by server 20 (FIG. 1) for auction types. Bids may be input into the system by (a) a reserve bid by the seller of the goods subject to auction; (b) absentee or pre-auction bids placed by user-bidders prior to the start of the auction and (c) live auction bids (incrementally larger bids or bid to win, high value bids) during the auction. These auction types include auctions for household goods, furniture, tools, cars, art and other items. In addition, the search function identifies the live auction start time. A pre-registered or "old" bidder 56 may enter the bid program 50 at step 56. The old bidder 57 input is shown in conjunction with step 56.

In step 58, the user or potential bidder selects item and views details of these items. Both text and image data for the goods or services subject to auction are provided to the potential bidder.

FIG. 3 diagrammatically illustrates display screen 50 which shows in area 152 a photograph or other illustration of the item subject to the auction and the plurality of thumbnail images in areas 154, 156 and 158 showing different views of the item subject to the auction. By clicking on one of the thumbnail images, a larger image is presented to the bidder. In area 160, a written description of the item subject to the auction is provided. A curtain is shown in display area 162 indicating that the auction has not begun. An audience in area 164 is employed to spur on bidders or gather additional absentee or pre-auction bids. The audience may move during the auction to stimulate new bids for the goods. Display area 166 is a countdown time clock to the auction time (showing one minute to auction).

Returning to step 60 in FIG. 2A, the auction system displays a curtain in region 162 of FIG. 3 and displays the time t to the auction. This time t to the auction is the auction countdown shown in display area 166 of FIG. 3. Decision step 62 in FIG. 2A determines whether the bidder wants to view additional items. If YES, the system loops back to step 58, selects a new item and permits a view of details per the search terms input by the bidder-user. If not, the system processes the NO branch from decision step 62 and executes step 64 which causes, at zero auction countdown value, the curtain in display area 162 to be raised. The auction is now in progress.

FIG. 4A shows parts of an auctioneer character figure 180. In a preferred or best embodiment, an articulated auctioneer figure 180 is used. At the beginning of the auction, auctioneer character figure 180 provides both an audio and video (downloaded data from server 20) of a short description of the auction goods shown in display area 152. Audio downloads are optional elements of the system. One of the thumbnail images 154 is shown in FIG. 4A. Step 66 in FIG. 2A activates the auction by the auctioneer character figure 180. In step 68, the auctioneer indicates visually and audibly "Can I start the bids at a certain value." Step 68 is optional. Optionally, a seller of the item to be auctioned may input as noted in 67 a reserve bid $Bid-R. This value is associated with the goods or services subject to the auction in a database DB in server 20. The starting value announced by the auctioneer character figure 180 may or may not be the bid reserve. The reserve bid is an amount input by the seller which is the minimum amount the seller will accept for the auction goods. If the bid reserve is too high, the auctioneer character figure may start at a lower bid in order to spur bids from the audience. In step 70, several inputs are noted. One type of input includes one or more absentee bids placed earlier by bidders who are not presently on line via telecommunications system 10 from one of the computers 12, 14, 16 or 17. That absentee bidder has previously viewed the items and input a bid amount into the auction system. These are pre-auction bids. The database DB and server 20 logs in that absentee bid for that particular item. When that item is to be auctioned, the absentee bid is one of the first bids shown by paddle 182 from audience 164. Step 71 progressively displays all absentee or pre-auction bids based upon bid value. See FIG. 4A. The system processes and displays in a monetary sequence all pre-auction absentee bids. Otherwise, a maximum bidder M may input $Bid-Max (over ride bid) with a confirmation input in step 69. $Bid-Max is a "bid to win." Returning to FIG. 3, this maximum bid or a "bid to win" is input twice, in the $Bid-Max data input area 170, and again into data input area 172. The Bidder-M activates hot spot "confirm" or activation area 174 on display of FIG. 3 in order to transmit that maximum bid to the auction clearinghouse 18, 20 in FIG. 1. In some sense, the bid to win is an override bid which is greater than the incremental bid discussed later. The bid program 50 jumps from jump point 2A-a in FIG. 2A to FIG. 2B.

In step 72, the system accepts as input 73 a number of bids from Bidders A, B, C, etc. For example, Bidder A selects the "bid now" active region 186 (FIG. 4A) and this active region on the display of FIG. 4A provides an incremental bid to the auction clearinghouse computers 18, 20. The display area is a "bid now" button which shows the next incrementally higher bid. Activating the bid now button inputs the displayed bid into the system with a bidder id. As discussed later, this is step A in the bid program. The incremental bid is a certain increment above a starting bid set by the auction system. The incremental bid and start bid is generally pre-set by the auction clearinghouse. For example, if the table shown in display 152 is valued at $150, the start bid may be $30 and the incremental bid values may be set in $10 increments and the "bid now" button progresses from $30 to $40 to $50 until sale. These features are preset prior to the auction by the auction clearinghouse computer.

Step 74 in FIG. 2B forms a display which includes the incremental bid $BidA-inc.1 and the bidder identifier or Id unique to Bidder A. First the paddles show all absentee bids preferably by monetary amount with the Bidder Id. See step 71. A display is formed for the paddle display 182 (bid amount and bidder id) and a tag display 188 (bid amount only). The paddle display 182 includes the current bid amount or $Bid-A-inc.1 as well as the bidder Id. The tag display 188 only shows the value of the bid. Step 74 is sometimes called step B herein. In step 76, the system activates the bid paddle display showing the bid value and the bidder Id for a certain period of time t paddle. The paddle is raised from the level of the audience. This is sometimes called step C. In step 78, auctioneer character figure 180 audibly and visually announces that a bid has been made. The audible aspect is optional. This is step D. In step 80, the auctioneer 180 awaits and calls for other bids from bidders, A, B or C. This is sometimes called step E (optional). In step 82, the system repeats the bid acceptance and display steps A-E. When each incremental bid is accepted from a Bidder A, B, C the system forms a paddle display including the incremental bid and a bidder Id and also changes the tag display 188. The paddle display varies among audience illustration 164 such that paddle 182 varies longitudinally among the crowd of bidders 164. When a bid is made, the paddle display is raised above crowd 164. In this manner, additional bids are seen from other bidding parties in order to simulate the activity of a live auction. The incremental bids are made substantially in real time (within the limits of communication traffic and computer processing times).

In step 84 (FIG. 2B), a decision is made whether the pending bids are less than the maximum bid received in step 70 above. The maximum bid $Bid-Max was either an absentee bid or a bid to win input by one of the bidders. One of these bidders may or may not be the bidder placing the incremental bids by striking active region 186. If the test from decision step 84 is YES, step 86 starts the auction time clock to the close sale routine. The close routine is discussed later in conjunction with the sequence of steps after step 122. With the time clock running in step 86, decision step 88 determines whether the auction system has accepted any additional bids. If YES, the system repeats to a point immediately prior to step 82 which repeats steps A-E. If not, the NO branch from step 88 goes to jump point 2B-a in FIG. 2C.

Returning to decision step 84, if the NO branch is taken, the system executes step 90 which is display $Bid-Max and the bidder id on tag 188 (FIG. 4A) (bid value only) and paddle 182 (FIG. 4A) (bid and id). In other words, incremental bids input by Bidders A, B, C in input step 73 have not exceeded the maximum bid win value $Bid-Max input by Bidder-M at input 68 in FIG. 2A. Since the maximum bid exceeds all incremental bids, the system executes decision step 92 which determines whether someone else, other than the bidder who input a higher maximum bid, inputs another higher incremental bid. If NO, the system goes to step 86 which starts the auction time clock to the close sale routine. If YES, the system in step 94 goes to Bidder M input (step 70) to see if another max bid has been input into clearinghouse computer 20. This recognizes that another Bidder n has input an incremental bid $Bid-Max-n which restarts the whole bidding process again and essentially activates steps A-E.

Figure 2C:
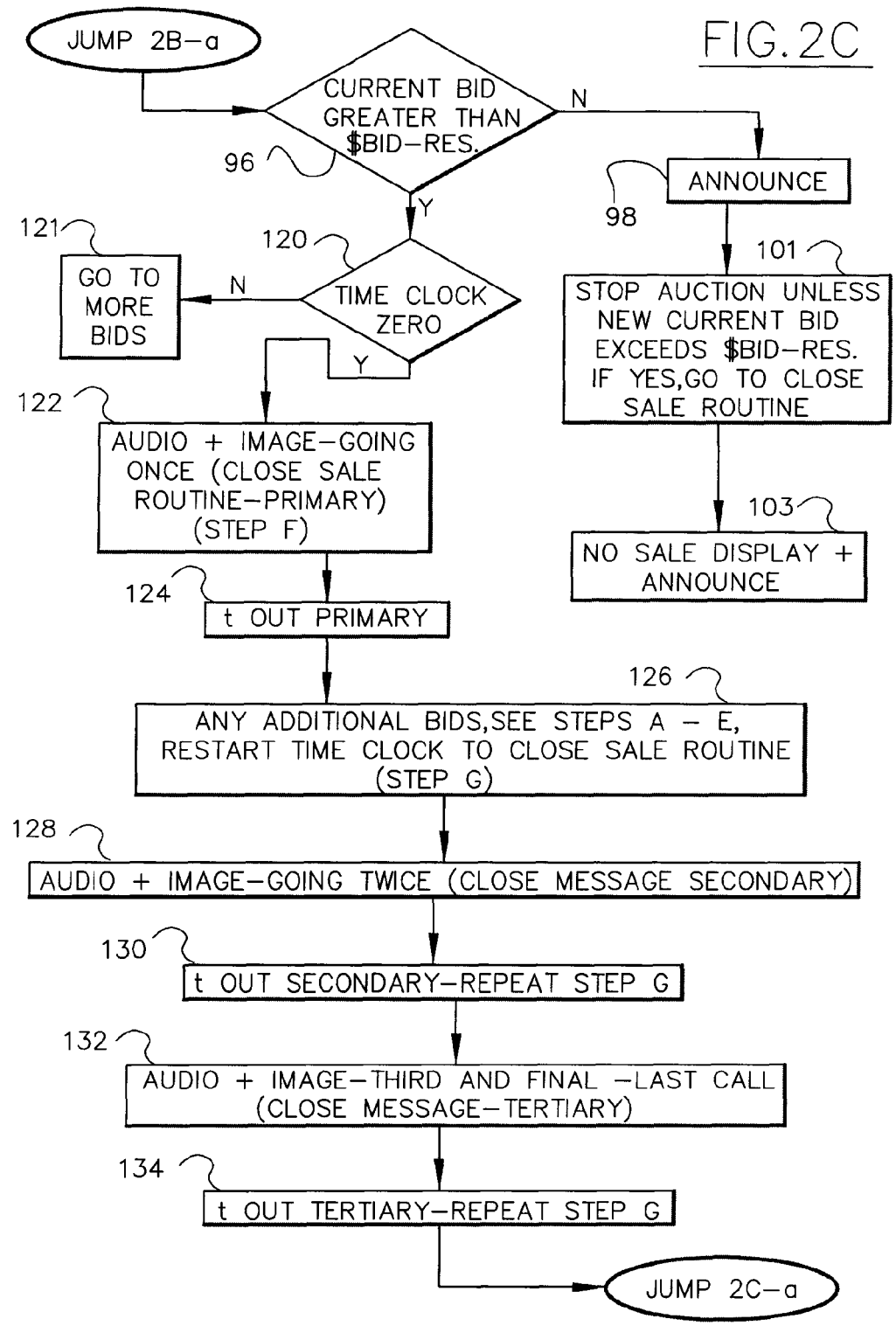

With respect to decision step 88, if no more bids are noted, the NO branch is taken from jump point 2B-a to FIG. 2C. Step 96 determines whether the current bid is greater than the bid reserved $Bid-Res. If not, the NO branch is taken and step 98 announces that the current bid does not exceed the reserve bid supplied earlier by the seller as input 67 in step 68. Step 101 in FIG. 2C is an announcement by auctioneer character figure 180 to stop the auction unless a new current bid exceeds the reserve bid. If the system determines the current bid now exceeds the reserve bid due to an input by computers 12, 14, 16 and 17 (FIG. 1), the system executes auction steps A-E and more importantly executes the close sale routine discussed later in conjunction with step 122. If the system indicates that no current bid exceeds the reserve bid, the system executes step 103 which announces a no sale and this no sale is displayed and announced audibly by auctioneer character figure 180.

Returning to step 96, if the current bid exceeds the reserve bid, the YES branch is taken to decision step 120. That decision step determines if the time out clock (time to close sale routine) has gone to zero. Please note that count up clocks may be used to determine when a predetermined time has passed. If not, the system in step 121 accepts more bids as shown and discussed earlier in conjunction with steps A-E. If the time out clock has counted down to zero, the YES branch is taken from step 120. In step 122 the auctioneer character figure 180 begins the close sale routine. This close sale routine is both audio signals and image display signals having the auctioneer character figure essentially indicate "going once, going twice, going three times and final call, sold." The auctioneer is an articulated figure in a current embodiment. Therefore, the close sale routine has three distinct features: a primary, secondary and tertiary feature including timeout routines for each sequence. The primary and tertiary closing routines are required. After step 122, the system in step 124 determines and counts down during the primary sequence "going once". In FIG. 4B, auctioneer character figure 180 displays a hand 190 with a single finger pointed up and indicating in display area 192 "going once." Other visual and audio displays may be used. The visual closing routine links the finger gesture with the video display "Going Once." Two fingers are shown in the secondary routine with "Going Twice." Three fingers are shown in the tertiary routine with "Going Third and Final Call." The current bid is shown in tag 188 as $Bid-B. In step 126, the system notes any additional bids during the closing routine and accepts that bid as steps A-E and restarts the time clock to the close sale routine. Sometimes this step is called step G.

In step 128, the system provides both an audio and image information to bidders and potential bidders on computers 12, 14, 16 and 17 representing the secondary portion of the close sale routine "going twice." This secondary sequence includes auctioneer character figure 180 showing two fingers on hand 190 and another "going twice" display 192. Associated audio files are sent to bidding computers. Step 130 conducts a timeout function for the secondary sequence of the close sale routine. The system also repeats step G which seeks any additional bids. In step 132, both audio and visual information is provided to the bid computers and potential bid computers indicating that the auctioneer character figure 180 has activated the third or final or last call. This is the tertiary sequence of the close sale routine. Step 134 indicates a timeout function for the tertiary sequence and indicates that the system waits for any additional bids in step G. If these additional bids are accepted by the clearinghouse, a paddle is raised as a display as shown and discussed above in connection with paddle 182 indicating the amount of a bid and the bidder Id. In addition, a tag label shown as tag 188 is formed and displayed showing the current bid for item 152. This additional incremental bid restarts the timeout clock which is the countdown clock for the close sale routine 86. Since the time out clock is started, the auctioneer character figure 180 repeats the close sale routine in order to spur additional bids from the bidders on line. The system jumps from jump point 2C-a to FIG. 2D. The visual actions of character figure 180 spur additional bids. Audio files simulate a real time auction.

Figure 4D:
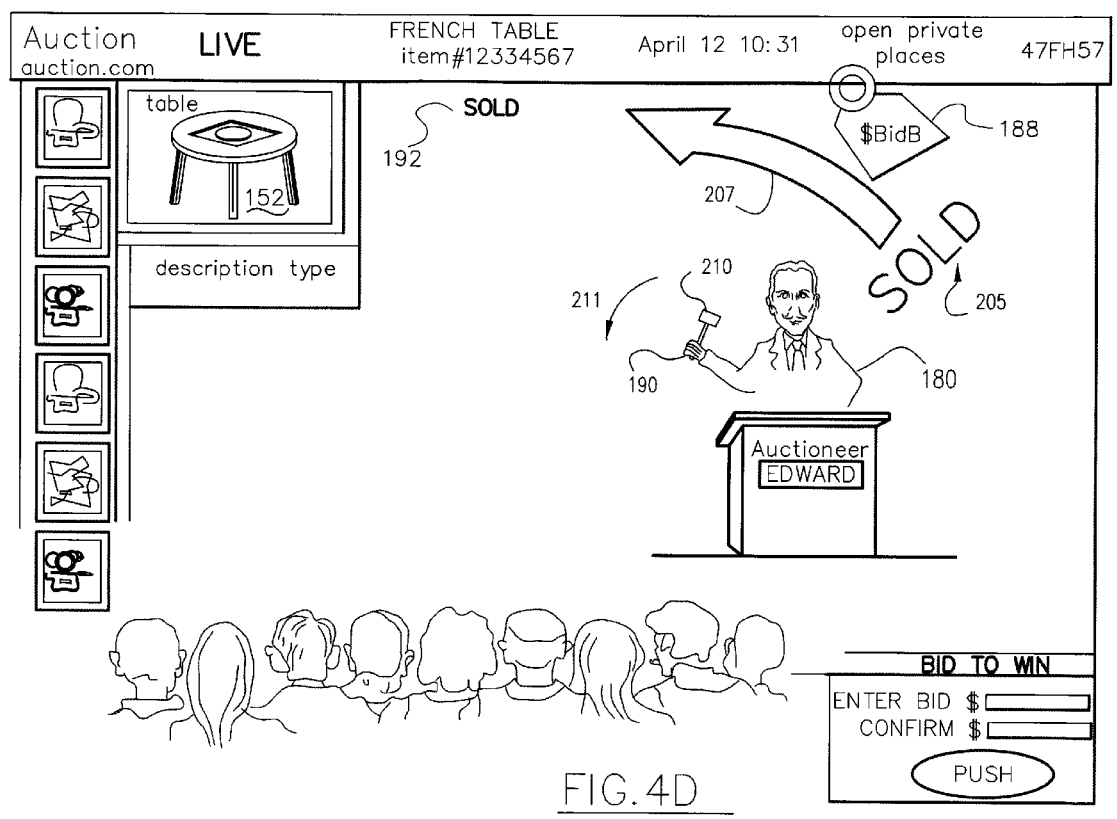

In step 136, the auctioneer character figure 180 indicates a sold item routine. This is shown in conjunction with FIG. 4D. The sold item routine in step 136 includes several display items. First, the auctioneer character figure 180 has a hand 190 that carries a gavel 210. The gavel is moved downward as shown by arrow 211 to indicate the item is sold. Substantially concurrently therewith, a large "sold" visual banner 105 is displayed as an overlay which floats in direction 207 to display area 192. The bid value or tag 188 shows the current sale for auction item 152. In step 138, the sold auction item is removed from the auction pool as noted by a marker placed in auction database DB in server 20 of the auction clearinghouse computer. Additionally, the "sold" item is viewable on a different web page with its price and date of auction as a reference for other user-bidders. In step 140, the system activates the back office program which facilitates payment from the buyer-successful bidder to the seller, and shipping of the good or service to the buyer and notice to the buyer as well as the seller of the final sale of the auction. The back office program may be administered by another entity other than the system operator. In step 142, the curtain shown in display area 162 is lowered. The next auction item, subject to a live auction, is displayed in the area 152. Step 144 repeats the entire process.

The claims appended hereto are meant to cover modifications and changes within the scope and spirit of the present invention.

What is claimed is:

1. A computerized method for conducting an auction of goods or services over a plurality of computers on a communications network, at least two of said plurality of computers initiating respective first and second groups of a plurality of bids for goods or services subject to auction, another one of said plurality of computers being an auction clearinghouse computer which accepts said first and second plurality of bids from said two computers, comprising:

providing real time display data and information about said auction goods or services to at least said two computers, said real time display includes at least a real time display of an animated audience, an auctioneer, a current bid, a description of the goods or services subject to auction, several thumbnail images of the goods or services subject to auction, said thumbnail images including several views of the goods subject to auction said thumbnail images becoming larger upon a user clicking on one of said thumbnail images, a curtain, and a display of a user's current bid, said curtain including a countdown clock indicating the time remaining before said auction begins;

displaying a bid now icon indicating the current bid and an increment over which a next bid should be;

accepting said first and second plurality of bids from said two computers;

sorting said first and second plurality of bids based upon bid value;

sending bid display data showing the then highest bid value and a bidder identifier unique to said highest bid value, said bid display data sent to said at least two of said plurality of computers;

accepting a bid to win bid, said bid to win bid being higher that said current bid;

displaying a current bid and a bid increment which the next bid should be;

accepting incrementally increasing bids, on a real time basis, from said at least two of said plurality of computers and displaying further bid display data showing the incrementally increased bid and the corresponding bidder identifier from said at least two of said plurality of computers;

accepting a high value override bid which exceeds said incrementally increased bid and displaying in the form of a paddle held by a bidder in said audience a high bid display data showing the incrementally increased bid and the corresponding bidder identifier;

progressing through all bids until a maximum bid is accepted and displayed as a maximum bid value with the corresponding bidder identifier for a predetermined time period;

displaying a character figure of said auctioneer announcing a closing sale subroutine including at least a first call and a final call for additional bids greater than said maximum bid, and thereafter, in the absence of a greater, additional bid during a predetermined closing time period, closing said auction with a sold item display routine;

including accepting pre auction bids with a pre auction bid value for said auction goods or services, said pre auction bids displayed on said paddles ranging form a lowest bid to a highest bid;

determining whether said reserve bid value if said maximum bid is less than said reserve bid value, and delaying said closing sale subroutine unless said maximum bid exceeds said reserve bid value;

restarting said closing sale subroutine in the event said auction clearinghouse receives said greater, additional bid during the closing time period;

said closing sale subroutine includes a second call for additional bids to supplement said first and final calls for additional bids;

said character figure of said auctioneer includes a head display, a body display, a hand display, including fingers and said closing sale subroutine includes an animated visual display of said character figure of said auctioneer showing a first call indicator, a second call indicator and a third and final call indicator, said visual call indicators including one indicator type from the group of indicator types including a visual hand display showing first, second and final calls indicated by a display of a corresponding number of said fingers, an animated visual balloon display emanating from said head display of said character figure of said auctioneer, and a visual gravel display showing different spatial locations of said gravel during said first, second and final calls;

processing sale data for said auctioned goods or services based upon the greater of said maximum bid and said greater additional bid;

displaying an animated icon above and in proximity to said auctioneer, said animated icon indicating that the said good or service has been sold;

repeating said auction with another good or service item and displaying a history of said bidding on a display separate from said display of said bidding.

2. A computerized method for conducting an auction of goods or services as claimed in claim 1 wherein some of said first and second plurality of bids from said two computers are absentee bids or pre-auction bids.

3. A computerized method for conducting an auction of goods or services as claimed in claim 1 wherein the auctioneer character figure is an articulated figure showing fingers as a progressive illustration during the closing subroutine.

4. A computerized method for conducting an auction of goods or services as claimed in claim 1 wherein said sold item routine includes a visual display of said character figure of said auctioneer yielding a visual representation of a gavel.

5. A computerized method for conducting an auction of goods or services as claimed in claim 1 wherein the step of said sending bid display data includes sending an associated audio file representative thereof.

6. A computerized method for conducting an auction of goods or services as claimed in claim 5 wherein said closing sale routine and said first and final call includes both visual display of said character figure of said auctioneer and includes sending an associated closing sale routine audio file representative thereof.

7. A computerized method for conducting an auction of goods or services as claimed in claim 6 wherein said sold item display routine includes sending an associated sold item routine audio file representative thereof.

8. A computerized method for conducting an auction of goods or services as claimed in claim 7 including visually indicating and sending an associated audio file representative of both a predetermined auction time and a count down to a beginning of auction time to said at least two computers.

9. A computerized method for conducting an auction of goods or services as claimed in claim 8 wherein some of said first and second plurality of bids from said two computers are absentee bids.

10. A computerized method for conducting an auction of goods or services as claimed in claim 9 including accepting a reserve bid with a reserve bid value for said auction goods or services; determining whether said reserve bid value if said maximum bid is less than said reserve bid value, and delaying said closing sale subroutine unless said maximum bid exceeds said reserve bid value.

11. A computerized method for conducting an auction of goods or services as claimed in claim 10 wherein said sold item routine includes a visual display of said character figure of said auctioneer yielding a visual representation of a gavel.

* * * * *